Nov. 3, 1964      E. E. KINSEY ET AL      3,155,437
ELECTROMAGNETIC BEARING
Filed May 21, 1953

*INVENTORS*
EUGENE E. KINSEY
RAYMOND E. BRANDES
WALTER R. EVANS
BRUCE A. SAWYER
BY
William R. Lane
ATTORNEY United States Patent Office 3,155,437
Patented Nov. 3, 1964

3,155,437
ELECTROMAGNETIC BEARING
Eugene E. Kinsey, Bellflower, Raymond E. Brandes, Norwalk, Walter R. Evans, Whittier, and Bruce A. Sawyer, Los Angeles, Calif., assignors to North American Aviation, Inc.
Filed May 21, 1953, Ser. No. 356,538
18 Claims. (Cl. 308—10)

This invention relates to a magnetic bearing, and more particularly to a bearing in which the relatively movable member is electromagnetically suspended.

A desirable type of bearing is one which exhibits a minimum of friction to retard the motion of the relatively movable member. Some devices, such as gyroscopes and distance meters, are sensitive to the torques exhibited in the various bearings which provide a means of mounting. For instance, in a gyroscope, any torque caused by friction in the precession axis will cause the gyro to drift. Bearing friction is also undesirable in meter instruments because compensation is required to remove the inaccuracies incurred as a result of such friction. Magnetic bearings are useful in such applications because theoretically, at least, they have no friction. Previous magnetic bearings, including the movable member, have generally been constructed of permanent magnets. Bearings constructed in this manner do not provide sufficient stiffness to be able to mount a relatively movable member of substantial size. No method is provided to increase the restoring magnetic pull when the aligned member is deflected.

It is therefore an object of this invention to provide an improve electromagnetic bearing for reducing the friction acting on the relatively movable element.

It is another object of this invention to provide an electromagnetic bearing exhibiting a stiffness dependent on the deflection of the movable element.

It is another object of this invention to provide a simple improved electromagnetic bearing which acts to stabilize the suspended element.

It is another object of this invention to provide an electromagnetic bearing which affords thrust stabilization and radial stabilization.

It is another object of this invention to provide an improved electromagnetic bearing for a movable element in which a slight displacement between the aligning bearing and the suspended element causes an increasing change in the electromagnetic field suspending the movable element.

Other objects of the invention will become apparent from the following description taken in connection with the accompanying drawings, in which FIG. 1 is a sectional view of the invention;

Figure 1:
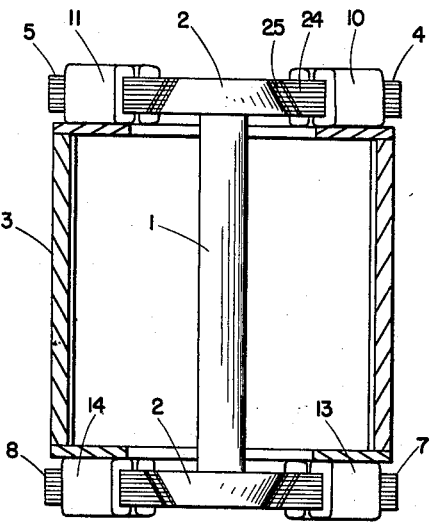

Referring now to FIG. 1, 1 represents the shaft member to be aligned. At opposite ends of shaft 1 are shown cone frustums 2 which are composed of laminations of ferromagnetic material, such as soft iron. Disposed around cone frustums 2 and conformed to their surfaces are electromagnetic cores 4 through 9. Cores 6 and 9 are not shown. Windings 10 through 15 control the flux density in cores 4 through 9, respectively. Windings 12 and 15 are not shown. The electromagnets are mounted upon structural frame 3.

Figure 2:
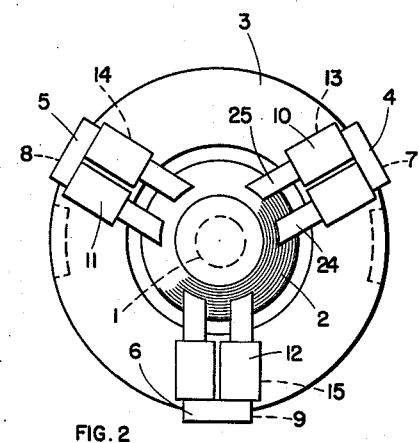
FIG. 2 is a top view of the invention.

In FIG. 2, indicating the relative disposition of the electromagnetic cores at the top end of the bearing, cores 4, 5, and 6 can be seen to be C-shaped. The windings upon them are divided into two parts each wound on one limb, or pole, of the core and connected in series addition.

Figure 3:
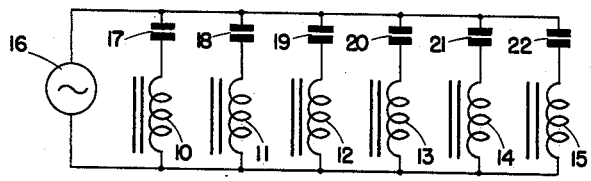
FIG. 3 is an electrical schematic diagram of the invention.

FIG. 3 shows the circuit connections. Each of the self inductive windings, 10 through 15, is connected in series with respective capacitances 17 through 22. These then form several tuned circuits which are all connected in parallel to power supply 16. Power supply 16 is a constant voltage, constant frequency A.-C. source.

Figure 4:
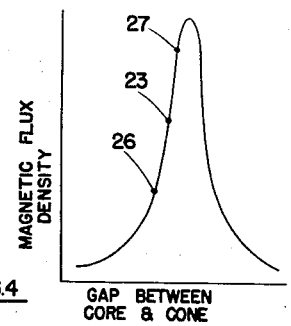
FIG. 4 is a flux density versus air gap curve.

FIG. 4 shows the point 23 on the flux density curve at which each inductance is operated. The value of each capacitor is adjusted so that the reactances of each capacitor and inductance combination is slightly inductive when the movable element, comprised of shaft 1 and frustums 2, is suspended at the median point within the bearing and such that the rate of change in flux density in the gap with respect to the gap dimension is a maximum. This means that tuned circuit operating point 23, FIG. 4, is on the steepest part of the curve, or near the inflection point. The circuit operates such that when all the gaps are equal, that is, when each cone frustum 2 is positioned equidistant from its respective cores, each core is operating at point 23 in FIG. 4. Suppose, then, that the movable element deflects under a load. The cone frustum 2 then approaches C-shaped core 4. Being constructed of soft iron, this frustum acts to decrease the air gap between the poles of each pair and provide a good magnetic path from one pole 24 of the core 4, FIG. 2, to the other pole 25 of core 4. Consequently, the reluctance of the magnetic path is lowered and the self-inductance of that particular coil is raised. In other words, the effective length of the air gap between poles 24 and 25 is shortened. Because each coil is part of the tuned circuit shown in FIG. 3, raising its self-inductance will reduce its current flow and the magnetic field reduces in intensity, moving to point 26 on the curve of FIG. 4. Similarly, cone frustums 2 having moved away from core 5, the self-inductance of winding 11 is reduced and more current flows in it, increasing the magnetic field to point 27. This is a desired feature. It means that the electromagnetic field suspending the movable element automatically adjusts itself in accordance with deflections or loads on the movable element. When the movable element is deflected in a particular direction, the electromagnetic field reduces its pull in that direction, and increases a restoring pull. The shape of the frustums 2 on each end of shaft 1 provides for both radial and longitudinal bearing thrust. Spherical sections may be substituted for these frustums. Ordinary gaps between magnets and frustums in this electromagnetic bearing are on the order of a few thousandths of an inch.

Figure 5:
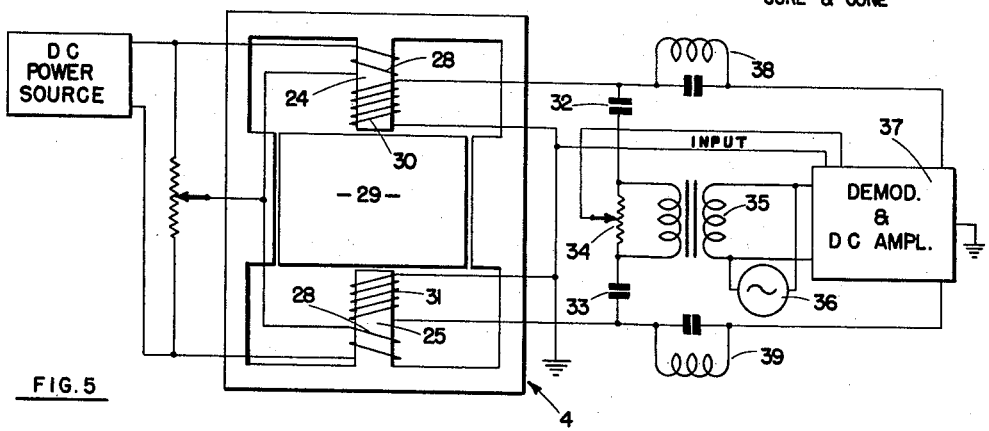
FIG. 5 is an electromagnetic bearing controlled by a servo circuit.

FIG. 5 illustrates the concept of controlling the magnetic field in accordance with the deflection of the aligned member by servo method. Establishment of equilibrium in one direction only (vertical) is shown. A D.-C. excited winding 28 wound on opposing poles 24 and 25 of core 4 provides a steady magnetic field which pulls on movable magnetic member 29 which corresponds to the shaft 1 and cone frustums 2 of FIG. 1. Windings 30 and 31 also wound upon poles 24 and 25 of core 4 are A.-C. excited through capacitors 32 and 33, and potentiometer 34 which is connected across the output of transformer 35. The primary of transformer 35 is connected to an A.-C. source 36. The A.-C. source 36 also provides power to a servo demodulator and D.-C. amplifier 37. The wiper of the potentiometer 34 is connected to provide input to the demodulator and amplifier 37. A typical demodulator is analyzed, for example, in the proceedings of the National Electronics Conference, volume 2, 1946, figures on pages 396 and 397. The output of demodulator and amplifier 37 is connected to the A.-C. windings 30 and 31 through wave traps 38 and 39. These traps keep the carrier frequency out of the D.-C. amplifier. A servo demodulator is one which receives a modulated input error signal whose sense is denoted by the instantaneous polarity of the carrier voltage relative to a reference voltage of carrier frequency. Source 36 provides both carrier frequency to coils 30 and 31 and the reference frequency to demodulator 37 which reproduces the envelope of the modulated error signal. A D.-C. amplifier connected to receive this error signal envelope provides in push pull fashion (as indicated in FIG. 5) a D.-C. voltage which will change the relative strength of opposing poles 24 and 25. Suspended member 29 is then magnetically restored to a median position so that no error input signal appears at the input to demodulator 37. If member 29 approaches either pole, changing the balance of reactance between opposing windings 30 and 31, a signal appears at the input to the demodulator and amplifier which then puts out an amount of D.-C. of a polarity to change the relative strengths of poles 24 and 25 to magnetically attract member 29 back to the median point, within the core 4. Thus, at least a portion of the pull on the aligned bearing member is servo controlled.

Figure 6:
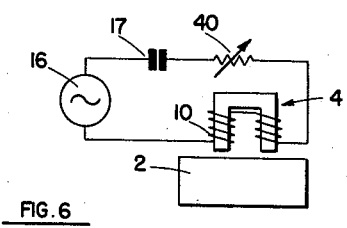
FIG. 6 is a tuned circuit which provides electrical damping of the bearing.

In addition to the stiffness provided by the magnetic field, damping forces are necessary to keep the amplitude of oscillation of the movable member sufficiently small so that the surface of the movable member never touches the magnets. FIG. 6 includes a time dependent nonlinear resistance element 40 which acts to increase the transient gain of the tuned circuit and decrease the steady state gain. The nonlinear element shown is a constant current device and is, therefore, included in series in the circuit. A nonlinear device such as a constant voltage device may be connected in parallel with, for example, inductance 10, providing similar means of electrical damping. Although damping forces could be achieved electrically, a simpler system is obtained by immersion of the entire bearing in a fluid. This flotation scheme makes it possible to obtain a much larger bearing stiffness for electromagnets of a given size. The static friction in a bearing constructed as above-described is remarkably low.

The procedure in setting a symmetrical gap of a given length in FIG. 1 is first to cage the shaft, move the C-shaped cores until each core is flush with the conical laminations, then uncage the shaft and extend its length a specific amount, thus determining an operating gap. Other methods of acquiring small gaps can be accomplished by grinding the faces of all three cores at once.

Although the invention has been described and illustrated in detail, it is to be clearly understood that the same is by way of illustration and example only and is not to be taken by way of limitation, the spirit and scope of this invention being limited only by the terms of the appended claims.

We claim:

1. A plurality of electromagnets, a relatively movable member suspended by the magnetic field of said electromagnets and in proximity thereto, the magnetic field of all of said electromagnets exerting a direct, suspending force on said member, and electrical means connected in circuit with said electromagnet, said electrical means responsive to variation in impedance of said electromagnets for varying the relative strength of said electromagnets inversely in response to the variation in proximity of said relatively movable member with respect to said electromagnets.

2. In an electromagnetic bearing, a plurality of electromagnets arranged to exert opposing magnetic forces on a common area, a relatively movable ferromagnetic member disposed in a non-conducting fluid and further disposed intermediate said electromagnets in said common area and magnetically suspended by the magnetic field of said electromagnets and means connected to said electromagnets for varying the strength of said electromagnets, said immediately previous means being responsive to the deflection of said movable member within the field of said electromagnets, so as to magnetically attract said deflected magnetic member to its original position.

3. In an electromagnetic bearing, a plurality of electromagnets, each having an air gap between its opposing poles, a movable ferromagnetic member magnetically suspended by the magnetic field of said electromagnets in variable proximity to each of said air gaps, said movable ferromagnetic member varying the reluctance of the electromagnetic path of each said electromagnet and electrical means connected in circuit with said electromagnets, said electrical means being responsive to said variation in reluctance for controlling the strength of each electromagnet inversely with the proximity of said magnetic member to the air gap of each electromagnet.

4. In an electromagnetic bearing, an A.-C. source, a plurality of electromagnetic windings, said electromagnetic windings relatively disposed to form a common electromagnetic field, a plurality of capacitors each connected in series with one of said electromagnetic windings and said source, a movable magnetic member disposed in the common magnetic field of said electromagnetic windings and solely suspended by the magnetic field of said windings.

5. In an electromagnetic bearing, a plurality of tuned circuits each comprised of a capacitor and an electromagnet, a relatively movable magnetic member disposed in the magnetic field of said electromagnets and solely suspended thereby in proximity to said electromagnets whereby the reluctance of the flux path of each of said electromagnets varies in accordance with the deflection of said movable magnetic member, and A.-C. power source means connected to said tuned circuits whereby the strength of each said magnet varies according to its reluctance.

6. The combination recited in claim 5 wherein said tuned circuit is predominantly inductive whereby the inductance of said electromagnets toward which said movable member moves is increased.

7. In an electromagnetic bearing, a plurality of electromagnets, a capacitor in circuit with the windings of each electromagnet forming a tuned circuit therewith, and a relatively movable magnetic member so constructed and arranged in solely magnetically suspended relationship with said electromagnets whereby the series impedance of each said capacitor and its respective electromagnet is changed according to the deflection of said movable member.

8. In a magnetic bearing, a plurality of electromagnets in fixed spaced relationship, said electromagnets each comprising a core and an electromagnetic winding, a ferromagnetic member relatively movable with respect to said electromagnets, and disposed within the field of said electromagnets, and solely magnetically suspended thereby, a plurality of capacitors each in series with one of said electromagnetic windings forming a tuned circuit therewith which is predominantly inductive, an A.-C. voltage source connected to said capacitors and electromagnets.

9. In an electromagnetic bearing, a plurality of electromagnets, a relatively movable magnetic member disposed in proximity to the poles of said electromagnets and solely suspended by the magnetic field thereof whereby the reluctance of said electromagnets is varied, an A.-C. source connected to excite said electromagnets, and D.-C. servo means connected to detect the relative A.-C. currents flowing in said electromagnets and provide a D.-C. bias current for said electromagnets in response to said A.-C. currents.

10. In an electromagnetic bearing, a relatively movable magnetic member, a plurality of electromagnets whose poles are in close spaced relationship with said member whereby the reluctance of the magnetic path of the cores of said electromagnets varies in accordance with the radial or axial deflection of said movable member, and means responsive to the change in reluctance of each said electromagnet, said means connected to each electromagnet to provide an increase in current flow in each electromagnet from which the movable member has been deflected and for decreasing the strength of each electromagnet toward which said member has moved.

11. In an electromagnetic bearing, a rotatable shaft, two magnetic members in spaced relationship attached to said shaft, a plurality of electromagnets each comprising a pair of poles in close spaced relationship with each respective magnetic member whereby the effective length of the air gap between corresponding pairs of poles is varied in accordance with the proximity of said magnetic members to said corresponding poles, and a capacitor connected in circuit with each electromagnet and forming a tuned circuit therewith which is predominantly inductive.

12. In an electromagnetic bearing, a rotatable shaft, first and second magnetic members attached to said shaft in fixed space relationship to each other, a plurality of electromagnets disposed around the first magnetic member, so constructed and arranged to pull the first magnetic member in a radial direction and in an axial direction, a plurality of electromagnets disposed around the second magnetic member, so constructed and arranged to pull said magnetic member in a radial direction and in an axial direction which is opposite to the axial direction in which the first magnetic member is pulled, a respective capacitance in series with the winding of each electromagnet forming a tuned circuit therewith which is tuned to a median point on the inductive side of the resonance curve of said tuned circuit when said magnetic members are undeflected, and A.-C. voltage means connected to said series capacitances and electromagnets.

13. In combination, a rotatable shaft, a magnetic member located at each end of said shaft, a plurality of electromagnets, the poles of each electromagnet disposed in close spaced relationship with one of said magnetic members whereby the radial or axial deflection of said magnetic member increases or decreases the effective length of the air gap between both poles of each electromagnet, a respective capacitor in circuit with each electromagnet forming a tuned circuit therewith which is predominantly inductive, and an A.-C. power source connected to excite said tuned circuits.

14. In an electromagnetic bearing, an A.-C. source, a plurality of electromagnets, a capacitor in circuit with each said electromagnet and said A.-C. source, and a movable magnetic member solely magnetically suspended within the field of said electromagnets.

15. In an electromagnetic bearing, an A.-C. source, a plurality of electromagnets circularly disposed, a capacitor in series with each said electromagnet and said A.-C. source, and a movable magnetic member centrally disposed in proximity to said electromagnets causing the reluctance of each said electromagnet to vary according to the deflection of said movable magnetic member whereby the current flow in said electromagnets varies according to the deflection of said magnetic member.

16. In an electromagnetic bearing comprising at least one electromagnet, a movable member disposed in the magnetic field of and solely suspended by said electromagnet in variable proximity thereto whereby the reluctance of said electromagnet is varied, and electrical power source means connected in circuit with said electromagnet for varying the strength of said electromagnet in response to the reluctance of said electromagnet.

17. In an electromagnetic bearing, a rotatable shaft, a magnetic member on the shaft, a plurality of electromagnets forming poles in close spaced relationship with the magnetic member, whereby the effective length of the air gaps between the magnetic member and the several poles is varied in accordance with the proximity of said magnetic member to the corresponding poles, and a capacitor connected in circuit with each electromagnet and forming a tuned circuit therewith which is predominately inductive.

18. In an electromagnetic bearing, a plurality of electromagnets, each having an air gap between its opposing poles, a movable ferromagnetic member magnetically suspended by the magnetic field of said electromagnets in variable proximity to each of said air gaps, said movable ferromagnetic member varying the reluctance of the electromagnetic path of each said electromagnet whereby the currents in said electromagnets are varied by variations in reluctance, electrical means connected in circuit with said electromagnets, said electrical means including an amplifier responsive to said variations in currents, and connections between the amplifier and the electromagnets for controlling the strength of each electromagnet inversely with the proximity of said magnetic member to the air gap of each electromagnet.

References Cited in the file of this patent

UNITED STATES PATENTS

| | | |
|---|---|---|
| 1,589,039 | Anschutz-Kaempfe | June 15, 1926 |
| 1,970,333 | Muehter | Aug. 14, 1934 |
| 2,256,937 | Beams et al. | Sept. 23, 1941 |
| 2,468,678 | MacKenzie | Apr. 26, 1949 |
| 2,566,221 | Lovell | Aug. 28, 1951 |
| 2,602,660 | Shannon | July 8, 1952 |

FOREIGN PATENTS

| | | |
|---|---|---|
| 539,409 | Great Britain | Sept. 9, 1941 |

OTHER REFERENCES

Proceedings of the National Electronics Conference, vol. 2, 1946, pages 395 to 399.